United States Patent
Bresson Boil et al.

(10) Patent No.: US 12,458,720 B2
(45) Date of Patent: Nov. 4, 2025

(54) COMPOSITION COMPRISING FRAGRANCE ISO-PROPLYIDENE GLYCOL

(71) Applicant: GIVAUDAN SA, Vernier (CH)

(72) Inventors: Alice Bresson Boil, Herblay (FR); Phillippe Blondeau, Paris (FR)

(73) Assignee: GIVAUDAN SA, Vernier (CH)

( * ) Notice: Subject to any disclaimer, the term of this patent is extended or adjusted under 35 U.S.C. 154(b) by 757 days.

(21) Appl. No.: 17/770,538

(22) PCT Filed: Nov. 9, 2020

(86) PCT No.: PCT/EP2020/081507
§ 371 (c)(1),
(2) Date: Apr. 20, 2022

(87) PCT Pub. No.: WO2021/099165
PCT Pub. Date: May 27, 2021

(65) Prior Publication Data
US 2022/0378970 A1 Dec. 1, 2022

(30) Foreign Application Priority Data

Nov. 21, 2019 (GB) .................................... 1916953
Nov. 21, 2019 (GB) .................................... 1916954

(51) Int. Cl.
*A61K 8/9755* (2017.01)
*A61K 8/34* (2006.01)
*A61L 9/04* (2006.01)
*A61Q 13/00* (2006.01)

(52) U.S. Cl.
CPC .................. *A61L 9/04* (2013.01); *A61K 8/34* (2013.01); *A61K 8/9755* (2017.08); *A61Q 13/00* (2013.01)

(58) Field of Classification Search
CPC ........ A61K 8/9755; A61K 8/34; A61Q 13/00; A61L 9/01; A61L 9/04
USPC ....................................................... 512/2, 1
See application file for complete search history.

(56) References Cited

U.S. PATENT DOCUMENTS

2018/0320106 A1 * 11/2018 Nascimento ........... A61Q 13/00

FOREIGN PATENT DOCUMENTS

| WO | 2013/092962 A2 | 6/2013 | |
|---|---|---|---|
| WO | 2016/119660 A1 | 8/2016 | |
| WO | 2017/137786 A1 | 8/2017 | |
| WO | 2017/157824 A1 | 9/2017 | |
| WO | WO-2018050721 A1 * | 3/2018 | ............... C11B 9/00 |

OTHER PUBLICATIONS

International Search Report and Written Opinion of the International Searching Authority for corresponding application PCT/EP2020/081507 dated Feb. 11, 2021.
GB Search Report for corresponding application GB 1916953.1 dated May 19, 2020.
Solvay: "Solvay Unveils Innovations at the World Perfumery Congress", Jul. 3, 2018, XP055771482, Retrieved from the Internet: URL:https://www.perfumerflavorist.com/frag rance/application/multiuse/Solvay-Unveils-Innovations-at-WPC-487244551.html [retrieved on Feb. 2, 2021].

* cited by examiner

*Primary Examiner* — Jessica Whiteley
(74) *Attorney, Agent, or Firm* — Norris McLaughlin, PA (57) ABSTRACT

The present invention relates to a composition comprising at least one fragrance ingredient, one or more solvents and water, a method for obtaining such a composition in the form of a homogeneous composition, and to the use of such a composition to release a fragrance in an atmosphere in a controlled way.

14 Claims, 3 Drawing Sheets

COMPOSITION COMPRISING FRAGRANCE ISO-PROPLYIDENE GLYCOL

COMPOSITION

This is an application filed under 35 USC 371 based on PCT/EP2020/081507, filed 09 Nov. 2020, which claimed priority to both GB 1916953.1 filed 21 Nov. 2019, and GB 1916954.9 filed 21 Nov. 2019. The present application claims the full priority benefit of all prior applications and incorporates by reference their full disclosures as if set forth herein.

The present invention relates to a composition comprising at least one fragrance ingredient, one or more solvents and water, a method for obtaining such a composition in the form of a homogeneous composition, and to the use of such a composition to release a fragrance in an atmosphere in a controlled way.

Devices designed to dispense fragrances into ambient air, thereby to impart a desirable and pleasant odor, are well known in the art. Such devices, commonly known as air fresheners or room deodorizers, are commercially available in a variety of forms. A particular type of device is the so-called "(electrical) plug-in" or "liquid electrical" device. They typically comprise (i) a fragrance-containing liquid composition that is held in a container or reservoir, (ii) a heatable emanating surface from which the fragrance can evaporate into the surrounding environment, and (iii) wicking means which draw the liquid composition via capillary action from the reservoir to the heatable emanating surface. This causes the accelerated evaporation of the composition and facilitates the dispersion of the fragrance into the ambient atmosphere. In some of the wick type dispensers, the wick and the emanating surface may be combined into a single molded unit to provide the same functions as the separate wick/diffuser units.

By "fragrance" is meant here a mixture of fragrance ingredients. By "fragrance ingredient" is meant chemical substance (or group of chemical substances) having an odor that may be employed in fragrance formulations for the primary purpose to provide a contribution of a pleasant odor, either alone or in combination with other fragrance ingredients.

Whatever the particular design of these devices, or the particular mechanism of fragrance emanation, it is imperative that they perform in a manner that allows fragrance material to be dispensed at a steady and controlled rate into an environment, and that the fragrance maintains, or substantially maintains its odor integrity or character. Furthermore, all fragrance ingredients should be consumed, or substantially consumed, at the same rate during the useful life of the device.

In order to address this, it is common to mix solvents with the fragrance ingredients to obtain a more uniform evaporation of the fragrance over time. The effect of these solvents is to lower the evaporation rate of the most volatile ingredients and to increase the evaporation rate of the less volatile ingredients. Solvents commonly used for this aim en-compass glycol ethers, isoparaffinic hydrocarbon oils, and dibasic esters. Usually, these solvents may be combined to provide optimal evaporation profile and polarity.

Owing to the growing concern related to volatile organic carbon, effort has been made to reduce the solvent content of air freshener compositions. For example, EP 0 462 605 A2 discloses an aqueous composition for controlled evaporation of a mixture comprising water, fragrance, and of 3-methyl-3-methoxybutanol or an ester thereof, as evaporation regulating and fragrance solubilizing solvent.

3-methyl-3-methoxybutanol, like most of the conventional solvents used in air fresheners, is a petrochemical solvent, derived from non-renewable fossil resources, whereas today consumers tend to prefer products based on sustainable ingredients that are either sourced from renewable feedstocks or at least derived from renewable feedstock.

It is therefore desirable to provide air freshener compositions, wherein 3-methyl-3-methoxybutanol and other petrochemical solvents are fully or at least partially replaced by solvents derived from natural, renewable feedstocks.

WO 2013/092962 A2 discloses ethanol-free fragrance microemulsions comprising up to 15 wt.-% of fragrance, isopropylidene glycerol ((2,2-dimethyl-1,3-dioxolan-4-yl)methanol) as co-solvent and up to 75 wt.-% water. However, these microemulsions require significant amounts of surfactant to keep stable and transparent during storage.

WO 2016/119660 A1 discloses fragrance compositions comprising isopropylidene glycerol as a carrier and water. However, this document provides no information on the amount of water that can be added to the composition in order to maintain stable and transparent during storage and use. Moreover, the compositions therein disclosed often comprise significant amounts of surfactants.

It appears from this prior art that it is generally difficult to obtain stable compositions that comprise simultaneously high levels of water and high levels of fragrance in the absence of surfactants. In particular, phase separation of the composition may be undesirable because phase separated products often have an unaesthetic aspect.

It is therefore a problem underlying the present invention to overcome the above-mentioned shortcomings in the prior art. In particular, it is a problem underlying the present invention to provide stable compositions of the above-mentioned kind, comprising simultaneously high levels of water and high levels of fragrance.

Therefore, in a first aspect, the present invention provides a composition comprising at least at least one fragrance ingredient, isopropylidene glycerol ((2,2-dimethyl-1,3-dioxolan-4-yl)methanol) and water. The maximum level of water in the composition is given by Equation 1:

$$W(\%) = (63 \pm 30) \exp^{((-0.38 \pm 0.025)(ClogP))} \quad \text{(Equation 1)}$$

(ClogP) is the weighted average ClogP of the at least one fragrance ingredient.

It has been found that by respecting Equation 1 maximum amounts of water can be added to the composition, while still ensuring it to be stable during storage and use.

By "weighted average ClogP" ($\langle ClogP \rangle$) is meant that the ClogP of the at least one fragrance ingredient is multiplied by the percentage of the at least one fragrance ingredient, based on the total weight of the at least one fragrance ingredient present in the composition, and that this product is summed over all fragrance ingredients present in the composition, i.e.

$$\langle ClogP \rangle = \frac{\sum_{i=1}^{N} c_i ClogP_i}{100} \quad \text{(Equation 2)}$$

where $c_i$ is the percentage of fragrance ingredient i by weight, based on the total weight of fragrance ingredients present in the composition, $ClogP_i$ is the ClogP value of this fragrance ingredient i and N is the total number of fragrance ingredients in the composition.

Equation 2 indicates that the maximal percentage of water than can be used in the composition in order to provide a homogenous composition increases with decreasing the weighted average ClogP of the at least one fragrance ingredient. Equation 2 applies in particular to situations where the total percentage of the at least fragrance ingredient is from 10 to 30 wt.-% by weight of the composition.

Isopropylidene glycerol ((2,2-dimethyl-1,3-dioxolan-4-yl)methanol) may be obtained from the condensation of natural glycerol and acetone. This solvent has the advantage of being miscible with water in all proportions and to be also miscible in most organic solvents (alcohols, ethers, hydrocarbons). This versatility confers to isopropylidene glycerol/water mixtures a good affinity with broad range of fragrance ingredients.

The composition may be homogeneous or water-clear. By "homogenous, water-clear composition" is meant a composition which is as transparent as water to the eye and consists of one single phase, meaning is not separated in, for example, an oil phase and an aqueous phase. In the context of the present invention, a homogeneous, water clear composition may be colored. Compositions that are phase separated or turbid are considered as "inhomogeneous" in the context of the present invention.

In preferred embodiments of the present invention, the composition comprises, preferably consists of:
a) From 5 to 40 wt.-%, preferably from 10 to 30 wt.-%, of at least one fragrance ingredient;
b) From 20 to 90 wt.-%, preferably from 40 to 85 wt.-%, more preferably from 60 to 80 wt.-%, of isopropylidene glycerol (2,2-dimethyl-1,3-dioxolan-4-yl)methanol); and
c) From 5 to 40 wt.-%, preferably 10 to 35 wt.-%, still more preferably 15 to 25 wt.-% of water.

Compositions having such preferred concentration ranges show the desired evaporation rates over time of about 0.3 gram/day to about 0.8 gram/day, when used in electrical plug-in air freshener devices operating at 65±5° C.

Other solvents, that improve the affinity of the at least one fragrance ingredient and the water/solvent mixtures and regulate the evaporation rate of the composition and that are fully or partially derived from renewable feedstock include glycerol formal ((1,3-dioxolan-4-yl)methanol and/or 1,3-dioxan-5-ol), (2-isopropyl-2-methyl-1,3-dioxolan-4-yl) methanol, triethyl citrate (triethyl 2-hydroxypropane-1,2,3-tricarboxylate), triacetin (1,2,3-triacetoxypropane), 1,2-propanediol, 1,3-propanediol and isosorbide (3,6-dimethoxyhexahydrofuro[3,2-b]furan).

Preferably, the derived natural solvents are selected from the group consisting of isopropylidene glycerol ((2,2-dimethyl-1,3-dioxolan-4-yl)methanol), triethyl citrate (triethyl 2-hydroxypropane-1,2,3-tricarboxylate), and triacetin (1,2,3-triacetoxypropane).

Additional solvents are also suitable for the sake of the present invention. These solvents include dipropylene glycol (mixture of 2,2'-oxydi-1-propanol, 1,1'-oxydi-2-propanol, and 2-(2-hydroxypropoxy)-1-propanol isomers), dipropylene glycol methyl ethers (for example Dowanol DPM isomers mixture, ex. Dow Chemicals)), tripropylene glycol methyl ethers (for example Dowanol TPM isomers mixture, ex Dow Chemical).

These additional solvents may help obtaining evaporation rates that are not achievable by using solvents that are fully or partially derived from renewable feedstock and/or enhancing composition homogeneity.

In particular embodiments, the composition additionally comprises a compound selected from the group consisting of dipropylene glycol (mixture of 2,2'-oxydi-1-propanol, 1,1'-oxydi-2-propanol and 2-(2-hydroxypropoxy)-1-propanol isomers), triethyl citrate (triethyl 2-hydroxypropane-1,2,3-tricarboxylate) and triacetin (1,2,3-triacetoxy propane).

In preferred embodiments of the present invention, the composition comprises, preferably consists of:
a) From 10 to 30 wt.-%, preferably from 15 to 25 wt.-% of at least one fragrance ingredient;
b) From 40 to 80 wt.-%, preferably from 50 to 70 wt.-%, of compounds selected from the group consisting of isopropylidene glycerol (2,2-dimethyl-1,3-dioxolan-4-yl)methanol), dipropylene glycol (mixture of 2,2'-oxydi-1-propanol, 1,1'-oxydi-2-propanol, and 2-(2-hydroxypropoxy)-1-propanol isomers), triethyl citrate (triethyl 2-hydroxypropane-1,2,3-tricarboxylate) and/or triacetin (1,2,3-triacetoxy propane); and
c) From 10 to 35 wt.-%, preferably 15 to 25 wt.-% of water.

Compositions having such preferred concentration ranges show the desired evaporation rates over time of about 0.3 gram/day to about 0.8 gram/day, when used in electrical plug-in air freshener devices operating from 65±5° C. up to 80±5° C. or above.

In context of the resent invention, fragrance ingredients may be selected from natural products such as essential oils, absolutes, resinoids, resins, concretes, and synthetic perfume components such as hydrocarbons, alcohols, aldehydes, ketones, ethers, acids, acetals, ketals and nitriles, including saturated and unsaturated compounds, aliphatic, carbo-cyclic and heterocyclic compounds, or precursors of any of the above. Other examples of odorant compositions which may be used are described in S. Arctander, Perfume and Flavor Chemicals, 1994, Montclair, New Jersey, USA.

Suitable fragrance ingredients that are useful in perfume compositions according to the invention include, but are not limited to, 2-METHYL 2-PENTENOIC ACID (2-methyl-pent-2-enoic acid); ACETOIN (3-hydroxybutan-2-one); ACETOPHENONE EXTRA (acetophenone); AGRUMEX™ (2-(tert-butyl)cyclohexyl acetate); ALCOHOL C 9 NONYLIC (nonan-1-ol); ALDEHYDE C 10 DECYLIC (decanal); ALDEHYDE C 11 UNDECYLENIC (undec-10-enal); ALDEHYDE C 12 LAURIC (dodecanal); ALDEHYDE C 6 HEXYLIC (Hexan-1-ol); ALDEHYDE C 8 OCTYLIC (octanal); ALDEHYDE C 9 NONYLIC (nonanal); ALLYL AMYL GLYCOLATE (prop-2-enyl 2-(3-methylbutoxy)acetate); ALLYL CYCLOHEXYL PROPIONATE (prop-2-enyl 3-cyclohexylpropionate); AMBRETTOLIDE ((Z)-oxacycloheptadec-10-en-2-one); AMBROFIX® (3a,6,6,9a-tetramethyldodecahydronaphtho[2,1-b]furan); ANETHOLE SYNTHETIC ((E)-1-methoxy-4-(prop-1-en-1-yl)benzene); ANJERUK® (1-phenylethanethiol); APHERMATE (1-(3,3-dimethylcyclohexyl)ethyl formate); AUBEPINE PARA CRESOL (4-methoxybenzaldehyde); BICYCLO NONALACTONE (octahydro-2H-chromen-2-one); BORNEOL CRYSTALS ((1S,2S,4S)-1,7,7-trimethyl-bicyclo[2.2.1]heptan-2-ol); BUTYL ACETATE (butyl acetate); BUTYL BUTYRO LACTATE (1-butoxy-1-oxopropan-2-yl butanoate); CARVONE LAEVO (2-methyl-5-(prop-1-en-2-yl)cyclohex-2-enone); CASHMERAN® (1,1,2,3,3-pentamethyl-2,3,6,7-tetrahydro-1H-inden-4(5H)-one); CASSYRANE® (5-tert-butyl-2-methyl-5-propyl-2H-furan); CEDRYL METHYL ETHER ((1R,6S,8aS)-6-methoxy-1,4,4,6-tetramethyloctahydro-1H-5,8a-methan-oazulene); CETALOX® (3a,6,6,9a-tetramethyl-2,4,5,5a,7,8,9,9b-octahydro-1H-benzo[e][1]benzofuran); CINNAMALVA (cinnamonitrile); CINNAMIC ALDEHYDE (cinnamaldehyde); CINNAMYL ACETATE (cinnamyl acetate);

CITRAL TECH ((E)-3,7-dimethylocta-2,6-dienal); CITRONELLOL (3,7-dimethyloct-6-en-1-ol); CITRONELLYL ACETATE (3,7-dimethyloct-6-en-1-yl acetate); CITRONELLYL OXYACETALDEHYDE (2-((3,7-dimethyloct-6-en-1-yl)oxy)acetaldehyde); CONIFERAN® (2-(tert-pentyl) cyclohexyl acetate); COUMARIN (2H-chromen-2-one); CYCLAL C (2,4-dimethylcyclohex-3-enecarbaldehyde); CYCLAMEN ALDEHYDE (3-(4-isopropylphenyl)-2-methylpropanal); CYCLOGALBANATE (prop-2-enyl 2-(cyclohexyloxy)acetate); CYCLOHEXAL (4-(4-hydroxy-4-methylpentyl)cyclohex-3-enecarbaldehyde); CYMENE PARA (p-cymene); CYPRISATE (methyl 1,4-dimethylcyclohexanecarboxylate); DAMASCENONE ((E)-1-(2,6,6-trimethylcyclohexa-1,3-dien-1-yl)but-2-en-1-one); DAMASCONE ALPHA ((E)-1-(2,6,6-trimethylcyclohex-2-en-1-yl)but-2-en-1-one); DAMASCONE DELTA ((E)-1-(2,6,6-trimethylcyclohex-3-en-1-yl)but-2-en-1-one); DECALACTONE GAMMA (5-hexyloxolan-2-one); DECENAL-4-TRANS ((E)-dec-4-enal); DIHYDRO EUGENOL (2-methoxy-4-propylphenol); DIHYDRO MYRCENOL (2,6-dimethyloct-7-en-2-ol); DIMETHYL BENZYL CARBINYL ACETATE (2-methyl-1-phenylpropan-2-yl acetate); DIMETHYL BENZYL CARBINYL BUTYRATE (2-methyl-1-phenylpropan-2-yl butanoate); DODECALACTONE DELTA (6-heptyltetrahydro-2H-pyran-2-one); EBANOL® ((E)-3-methyl-5-(2,2,3-trimethylcyclopent-3-en-1-yl)pent-4-en-2-ol); ELINTAAL (3-(1-ethoxyethoxy)-3,7-dimethylocta-1,6-diene); ETHYL BUTYRATE (ethyl butanoate); ETHYL ISOAMYL KETONE (6-methylheptan-3-one); ETHYL ISOVALERATE (ethyl 3-methylbutanoate); ETHYL LINALOOL ((E)-3,7-dimethylnona-1,6-dien-3-ol); ETHYL MALTOL (2-ethyl-3-hydroxy-4H-pyran-4-one); ETHYL METHYL-2-BUTYRATE (ethyl 2-methylbutanoate); ETHYL SAFRANATE (ethyl 2,6,6-trimethylcyclohexa-1,3-diene-1-carboxylate); ETHYL VANILLIN (3-ethoxy-4-hydroxybenzaldehyde); EUCALYPTOL ((1s,4s)-1,3,3-trimethyl-2-oxabicyclo[2.2.2]octane); EUGENOL (2-methoxy-4-prop-2-enylphenol); ESTERLY® ethyl cyclohexyl carboxylate; EVERNYL (methyl 2,4-dihydroxy-3,6-dimethylbenzoate); FENCHYL ALCOHOL ((1S,2R,4R)-1,3,3-trimethylbicyclo[2.2.1]heptan-2-ol); FLORALOZONE® (3-(4-ethylphenyl)-2,2-dimethylpropanal); FLORHYDRAL® (3-(3-isopropylphenyl) butanal); FLORIDILE® ((E)-undec-9-enenitrile); FLOROPAL® (2,4,6-trimethyl-4-phenyl-1,3-dioxane); GALBANONE (1-(3,3-dimethylcyclohex-1-en-1-yl)pent-4-en-1-one); GERANIOL ((E)-3,7-dimethylocta-2,6-dien-1-ol); HEDIONE (methyl 3-oxo-2-pentylcyclopentaneacetate); HELIOTROPINE CRYSTALS (benzo[d][1,3] dioxole-5-carbaldehyde); HEXENYL ACETATE CIS-3 (cis-hex-3-enyl acetate); HEXENYL-3-CIS BENZOATE ((Z)-hex-3-en-1-yl benzoate); HEXENYL-3-CIS SALICYLATE ((Z)-hex-3-en-1-yl 2-hydroxybenzoate); HEXYL BUTYRATE (hexyl butanoate); HEXYL ISOBUTYRATE (hexyl isobutanoate); IONONE BETA ((E)-4-(2,6,6-trimethylcyclohex-1-en-1-yl)but-3-en-2-one); IRISONE PURE ((E)-4-(2,6,6-trimethylcyclohex-2-en-1-yl)but-3-en-2-one); ISO E SUPER® (1-(2,3,8,8-tetramethyl-1,2,3,4,5,6,7,8-octahydronaphthalen-2-yl)ethanone); ISOAMYL BUTYRATE (isopentyl butanoate); ISOCYCLOCITRAL (2,4,6-trimethylcyclohex-3-enecarbaldehyde); ISOEUGENOL ((E)-2-methoxy-4-(prop-1-en-1-yl)phenol); ISOMENTHONE DL (2-isopropyl-5-methylcyclohexanone); ISOPENTYL ISOVALERATE (isopentyl 3-methylbutanoate); ISOPROPYL-2 METHYL-4 THIAZOLE (2-isopropyl-4-methylthiazole); ISORALDEINE® 70 ((E)-3-methyl-4-(2,6,6-trimethylcyclohex-2-en-1-yl)but-3-en-2-one); JASMATONE® (2-hexylcyclopentanone); JAVANOL® ((1-methyl-2-((1,2,2-trimethylbicyclo[3.1.0]hexan-3-yl)methyl) cyclopropyl)methanol); KOHINOOL® (3,4,5,6,6-pentamethylheptan-2-ol); LABIENOXIME ((3E,6E)-2,4,4,7-tetramethylnona-6,8-dien-3-one oxime); LEMONILE® ((2E,6Z)-3,7-dimethylnona-2,6-dienenitrile); LIFFAROME® ((Z)-hex-3-en-1-yl methyl carbonate); MACEAL (bicyclo[2.2.2]oct-5-ene-2-carboxaldehyde); MAHONIAL® ((4E)-9-hydroxy-5,9-dimethyl-4-decenal); MANZANATE (ethyl 2-methylpentanoate); MENTHOL (2-isopropyl-5-methylcyclohexanol); METHOXY PHENYL BUTANONE (4-(4-methoxyphenyl)butan-2-one); METHYL AMYL KETONE (heptan-2-one); METHYL ANTHRANILATE (methyl 2-aminobenzoate); METHYL CINNAMATE (methyl cinnamate); METHYL HEPTENONE (6-methylhept-5-en-2-one); METHYL HEXYL KETONE (octan-2-one); METHYL PAMPLEMOUSSE® (6,6-dimethoxy-2,5,5-trimethylhex-2-ene); MUSK C14 (1,4-dioxacyclohexadecane-5,16-dione); MYRCENE 90 (7-methyl-3-methyleneocta-1,6-diene); NEOFOLIONE ((E)-methyl non-2-enoate); NYMPHEAL® (3-(4-isobutyl-2-methylphenyl)propanal); ORANGER CRYSTALS (1-(2-naphtalenyl)-ethanone); OXANE® 50%/TEC (2-methyl-4-propyl-1,3-oxathiane); OXYOCTALINE FORMATE (2,4a,5,8a-tetramethyl-1,2,3,4,4a,7,8,8a-octahydronaphthalen-1-yl formate); PARADISAMIDE® (2-ethyl-N-methyl-N-(m-tolyl)butanamide); PEACH PURE (5-heptyldihydrofuran-2(3H)-one); PELARGOL (3,7-dimethyloctan-1-ol); PHENOXY ACETALDEHYDE 50 (2-phenoxyacetaldehyde); PRUNOLIDE (5-pentyldihydrofuran-2(3H)-one); RADJANOL® ((E)-2-ethyl-4-(2,2,3-trimethylcyclopent-3-en-1-yl)but-2-en-1-ol); RASPBERRY KETONE (N112) (4-(4-hydroxyphenyl)butan-2-one); RESEDAL (2-(cyclohexylmethyl)-4,4,6-trimethyl-1,3-dioxane); RHUBAFURAN® (2,4-dimethyl-4-phenyltetrahydrofuran); ROSYFOLIA® ((1-methyl-2-(5-methylhex-4-en-2-yl)cyclopropyl)-methanol); STRAWBERRY PURE (ethyl methyl phenyl glycidate); SYLKOLIDE® ((E)-2-((3,5-dimethylhex-3-en-2-yl) oxy)-2-methylpropyl cyclopropanecarboxylate); TERPENYL ACETATE (2-(4-methylcyclohex-3-en-1-yl) propan-2-yl acetate); THYMOL CRYSTALS (2-isopropyl-5-methylphenol); TRANS-2-HEXENAL (E-hex-2-enal); TRICYCLAL (2,4-dimethylcyclohex-3-enecarbaldehyde); TRIFERNAL (3-phenylbutanal); TRIMOFIX O® (1-((2E, 5Z,9Z)-2,7,8-trimethylcyclododeca-2,5,9-trien-1-yl)ethanone); UNDECAVERTOL ((E)-4-methyldec-3-en-5-ol); VANILLIN (4-hydroxy-3-methoxybenzaldehyde); ZINARINE® (2-(2,4-dimethylcyclohexyl)pyridine).

In preferred embodiments of the present invention, the composition comprises at least two fragrance ingredients.

The applicant has found that fragrance ingredients having a low lipophilicity, as defined by the logarithm of the calculated octanol/water partition coefficient (ClogP), were particularly compatible with the present invention, leading to homogeneous, water-clear compositions.

In preferred embodiments of the present invention, the weighted average ClogP of the at least one fragrance ingredient or at least two fragrance ingredients, respectively, is 4 or less, preferably 3.5 or less, more preferably 3 or less, based on the total weight of the at least one fragrance ingredient present in the composition, wherein ClogP is the calculated octanol/water partition coefficient of the at least one fragrance ingredient. In the present case, ClogP is calculated by using the calculation software embedded in ChemDraw professional software version 18.1.0.535.

Fragrance ingredients and more particularly mixtures of fragrance ingredients, having the preferred weighted average ClogP ranges mentioned hereinabove are particularly compatible with the present invention. The advantage of this is that compositions comprising such fragrance ingredients are homogeneous, even when relatively high amounts of water are added, meaning they do generally not phase separate into an apolar phase and a polar phase, as would often fragrance ingredients having a higher weighted average ClogP.

In preferred embodiments of the present invention, at least 70 wt.-%, preferably at least 80 wt.-%, more preferably at least 90 wt.-% of the at least one fragrance ingredient or at least two fragrance ingredients, respectively, have a ClogP of 4 or less.

The following preferred fragrance ingredients have a ClogP of 4 or less: ACETOIN (3-hydroxybutan-2-one); ACETOPHENONE EXTRA (acetophenone); AGRUMEX® (2-(tert-butyl)cyclohexyl acetate); ALCOHOL C 9 NONYLIC (nonan-1-ol); ALDEHYDE C 10 DECYLIC (decanal); ALDEHYDE C 11 UNDECYLENIC (undec-10-enal); ALDEHYDE C 12 LAURIC (dodecanal); ALDEHYDE C 6 HEXYLIC (Hexan-1-ol); ALDEHYDE C 8 OCTYLIC (octanal); ALDEHYDE C 9 NONYLIC (nonanal); ALLYL AMYL GLYCOLATE (prop-2-enyl 2-(3-methylbutoxy)acetate); ALLYL CYCLOHEXYL PROPIONATE (prop-2-enyl 3-cyclohexylpropionate); ANETHOLE SYNTHETIC ((E)-1-methoxy-4-(prop-1-en-1-yl)benzene); ANJERUK® (1-phenylethanethiol); APHERMATE (1-(3,3-dimethylcyclohexyl)ethyl formate); AUBEPINE PARA CRESOL (4-methoxybenzaldehyde); BICYCLO NONALACTONE (octahydro-2H-chromen-2-one); BORNEOL CRYSTALS ((1S,2S,4S)-1,7,7-trimethylbicyclo[2.2.1]heptan-2-ol); BUTYL ACETATE (butyl acetate); BUTYL BUTYRO LACTATE (1-butoxy-1-oxopropan-2-yl butanoate); CARVONE LAEVO (2-methyl-5-(prop-1-en-2-yl)cyclohex-2-enone); CINNAMALVA (cinnamonitrile); CINNAMIC ALDEHYDE (cinnamaldehyde); CINNAMYL ACETATE (cinnamyl acetate); CITRAL TECH ((E)-3,7-dimethylocta-2,6-dienal); CITRONELLOL (3,7-dimethyloct-6-en-1-ol); CITRONELLYL ACETATE (3,7-dimethyloct-6-en-1-yl acetate); CITRONELLYL OXYACETALDEHYDE (2-((3,7-dimethyloct-6-en-1-yl)oxy)acetaldehyde); COUMARIN (2H-chromen-2-one); CYCLAL C (2,4-dimethylcyclohex-3-enecarbaldehyde); CYCLAMEN ALDEHYDE (3-(4-isopropylphenyl)-2-methylpropanal); CYCLOGALBANATE (prop-2-enyl 2-(cyclohexyloxy)acetate); CYPRISATE (methyl 1,4-dimethylcyclohexanecarboxylate); DAMASCENONE ((E)-1-(2,6,6-trimethylcyclohexa-1,3-dien-1-yl)but-2-en-1-one); DAMASCONE ALPHA ((E)-1-(2,6,6-trimethylcyclohex-2-en-1-yl)but-2-en-1-one); DAMASCONE DELTA ((E)-1-(2,6,6-trimethylcyclohex-3-en-1-yl)but-2-en-1-one); DECALACTONE GAMMA (5-hexyloxolan-2-one); DECENAL-4-TRANS ((E)-dec-4-enal); DIHYDRO EUGENOL (2-methoxy-4-propylphenol); DIHYDRO MYRCENOL (2,6-dimethyloct-7-en-2-ol); DIMETHYL BENZYL CARBINYL ACETATE (2-methyl-1-phenylpropan-2-yl acetate); DODECALACTONE DELTA (6-heptyltetrahydro-2H-pyran-2-one); ELINTAAL (3-(1-ethoxyethoxy)-3,7-dimethylocta-1,6-diene); ESTERLY® (ethyl cyclohexyl carboxylate); ETHYL BUTYRATE (ethyl butanoate); ETHYL ISOAMYL KETONE (6-methylheptan-3-one); ETHYL ISOVALERATE (ethyl 3-methylbutanoate); ETHYL LINALOOL ((E)-3,7-dimethylnona-1,6-dien-3-ol); ETHYL MALTOL (2-ethyl-3-hydroxy-4H-pyran-4-one); ETHYL METHYL-2-BUTYRATE (ethyl 2-methylbutanoate); ETHYL SAFRANATE (ethyl 2,6,6-trimethylcyclohexa-1,3-diene-1-carboxylate); ETHYL VANILLIN (3-ethoxy-4-hydroxybenzaldehyde); EUCALYPTOL ((1s,4s)-1,3,3-trimethyl-2-oxabicyclo[2.2.2]octane); EUGENOL (2-methoxy-4-prop-2-enylphenol); EVERNYL (methyl 2,4-dihydroxy-3,6-dimethylbenzoate); FENCHYL ALCOHOL ((1S,2R,4R)-1,3,3-trimethylbicyclo[2.2.1]heptan-2-ol); FLORALOZONE® (3-(4-ethylphenyl)-2,2-dimethylpropanal); FLORHYDRAL® (3-(3-isopropylphenyl)butanal); FLORIDILE® ((E)-undec-9-enenitrile); FLOROPAL® (2,4,6-trimethyl-4-phenyl-1,3-dioxane); GALBANONE (1-(3,3-dimethylcyclohex-1-en-1-yl)pent-4-en-1-one); GERANIOL ((E)-3,7-dimethylocta-2,6-dien-1-ol); HEDIONE (methyl 3-oxo-2-pentylcyclopentaneacetate); HELIOTROPINE CRYSTALS (benzo[d][1,3]dioxole-5-carbaldehyde); HEXENYL ACETATE CIS-3 (cis-hex-3-enyl acetate); HEXYL BUTYRATE (hexyl butanoate); HEXYL ISOBUTYRATE (hexyl isobutanoate); IONONE BETA ((E)-4-(2,6,6-trimethylcyclohex-1-en-1-yl)but-3-en-2-one); IRISONE PURE ((E)-4-(2,6,6-trimethylcyclohex-2-en-1-yl)but-3-en-2-one); ISOAMYL BUTYRATE (isopentyl butanoate); ISOCYCLOCITRAL (2,4,6-trimethylcyclohex-3-enecarbaldehyde); ISOEUGENOL ((E)-2-methoxy-4-(prop-1-en-1-yl)phenol); ISOMENTHONE DL (2-isopropyl-5-methylcyclohexanone); ISO-PENTYL ISOVALERATE (isopentyl 3-methylbutanoate); JASMATONE® (2-hexylcyclopentanone); LABIENOXIME ((3E,6E)-2,4,4,7-tetramethylnona-6,8-dien-3-one oxime); LEMONILE® ((2E,6Z)-3,7-dimethylnona-2,6-dienenitrile); LIFFAROME® ((Z)-hex-3-en-1-yl methyl carbonate); MAHONIAL® ((4E)-9-hydroxy-5,9-dimethyl-4-decenal); MANZANATE® (ethyl 2-methylpentanoate); MENTHOL (2-isopropyl-5-methylcyclohexanol); METHOXY PHENYL BUTANONE (4-(4-methoxyphenyl)butan-2-one); METHYL AMYL KETONE (heptan-2-one); METHYL ANTHRANILATE (methyl 2-aminobenzoate); METHYL CINNAMATE (methyl cinnamate); METHYL HEPTENONE (6-methylhept-5-en-2-one); METHYL HEXYL KETONE (octan-2-one); METHYL PAMPLEMOUSSE® (6,6-dimethoxy-2,5,5-trimethylhex-2-ene); MUSK C14 (1,4-dioxacyclohexadecane-5,16-dione); NEOFOLIONE ((E)-methyl non-2-enoate); NYMPHEAL® (3-(4-isobutyl-2-methylphenyl)propanal); ORANGER CRYSTALS (1-(2-naphtalenyl)-ethanone); PARADISAMIDE® (2-ethyl-N-methyl-N-(m-tolyl)butanamide); PEACH PURE (5-heptyldihydrofuran-2(3H)-one); PELARGOL (3,7-dimethyloctan-1-ol); PHENOXY ACETALDEHYDE (2-phenoxyacetaldehyde); PRUNOLIDE (5-pentyldihydrofuran-2(3H)-one); RASPBERRY KETONE (N112) (4-(4-hydroxyphenyl)butan-2-one); RESEDAL (2-(cyclohexylmethyl)-4,4,6-trimethyl-1,3-dioxane); RHUBAFURAN® (2,4-dimethyl-4-phenyltetrahydrofuran); ROSYFOLIA® ((1-methyl-2-(5-methylhex-4-en-2-yl)cyclopropyl)-methanol); STRAWBERRY PURE (ethyl methyl phenyl glycidate); TERPENYL ACETATE (2-(4-methylcyclohex-3-en-1-yl)propan-2-yl acetate); THYMOL CRYSTALS (2-isopropyl-5-methylphenol); TRANS-2-HEXENAL (E-hex-2-enal); TRICYCLAL (2,4-dimethylcyclohex-3-enecarbaldehyde); TRIFERNAL (3-phenylbutanal); UNDECAVERTOL ((E)-4-methyldec-3-en-5-ol); VANILLIN (4-hydroxy-3-methoxybenzaldehyde).

In preferred embodiments of the present invention, less than 30 wt.-%, preferably less than 20 wt.-%, more preferably less than 10 wt.-%, of the at least one fragrance ingredient or at least two fragrance ingredients, respectively, have a ClogP higher than 4. Even if the weighted average ClogP of the at least two fragrance ingredients is in the preferred range mentioned in the preceding paragraph, a too high level of such apolar ingredients may induce these apolar ingredients to phase separate. This can be avoided by limiting their amount.

The compositions according to the invention may also comprise fragrance ingredients that, additionally to their contribution to the fragrance odor, may also control the evaporation rate and complement the action of aforementioned solvents. These fragrance ingredients are referred to as fillers in the context of the present invention.

Fragrance ingredients that are particularly suitable as fragrance fillers in the composition according to the present invention have preferably a ClogP value of 4 or less, for the same reason of compatibility with the present invention.

In particular embodiments of the present invention, fragrance fillers may be selected from the group consisting DIETHYL MALONATE (diethyl propanedioate, ClogP=0.7); ETHYL ACETOACETATE (ethyl 3-oxobutanoate, ClogP=0.72); BENZYL ALCOHOL (ClogP=1.03); PHENYL ETHYL ALCOHOL (2-phenylethanol, ClogP=1.3); FLOROSA HC (tetrahydro-4-methyl-2-(2-methylpropyl)-2H-pyran-4-ol, ClogP=1.6); BENZALDEHYDE (ClogP=1.9); BENZYL ACETATE (ClogP=1.96); ISOAMYL ACETATE (3-methylbutyl acetate, ClogP=2.1); GARDENOL (1-phenylethyl acetate, ClogP=2.5); TERPINEOL PURE (2-(4-methylcyclohex-3-en-1-yl)propan-2-ol, ClogP=2.6); JASMACYCLENE ((3aR,6S,7aS)-3a,4,5,6,7,7a-hexahydro-1H-4,7-methanoinden-6-yl acetate, ClogP=2.87); DIHYDRO MYRCENOL (2,6-dimethyloct-7-en-2-ol, ClogP=3.03); ETHYL CAPROATE (ethyl hexanoate, ClogP=3.1); LINALOOL (3,7-dimethylocta-1,6-dien-3-ol, ClogP=3.28); HEXYL ACETATE (ClogP=3.3); ETHYL LINALOOL ((E)-3,7-dimethylnona-1,6-dien-3-ol, ClogP=3.3); DIHYDRO LINALOOL (3,7-dimethyloct-6-en-3-ol, ClogP=3.32); ETHYL OENANTHATE (ethyl heptanoate, ClogP=3.36); FRESKOMENTHE (2-(sec-butyl)cyclohexanone, ClogP=3.4); DIMYRCETOL (2,6-dimethyloct-7-en-2-ol, ClogP=3.49); TETRAHYDRO LINALOOL (3,7-dimethyloctan-3-ol, ClogP=3.6); TETRAHYDRO MYRCENOL (2,6-dimethyloctan-2-ol, ClogP=3.6); OPALAL (7-isopropyl-8,8-dimethyl-6,10-dioxaspiro[4.5]decane, ClogP=3.6); ROSSITOL (3-(2-methylpropyl)-1-methylcyclohexanol, ClogP=3.76); BORNYL ACETATE ((2S,4S)-1,7,7-trimethylbicyclo[2.2.1]heptan-2-yl acetate, ClogP=3.8).

The water used in the composition according to the present invention may be deionized water, tap water or constitutive water present in plants. The constitutive water present in plant may be obtained by extraction or expression of the plant material and is typically purified so that it becomes tasteless and odorless.

The composition of the present invention may also comprise odoriferous aqueous plant extracts, usually referred to as "hydrosols" or "botanical water".

Typically, these hydrosols are obtained by extracting plants with boiling water, according to processes known to the art. Typically, hydrosols are obtained through a distillation process, wherein the hydrosol is recuperated as distillate. If necessary, essential oils that may have been entrained by the steam are removed from the hydrosol by decantation.

The hydrosol may be used as such or diluted with deionized water, tap water or water extracted from plants.

In particular embodiments of the present invention, the hydrosol may be selected from the group consisting of blackcurrant, camphor, celery seed, chamomile, cinnamon, clove, copal, cypress, eucalyptus, fennel, ginger, helichyrsum, jambora, jasmine, juniper berries, lemongrass, lavender, lemon, lime, *litsea cubeba*, mint, myrrh, neroli, nutmeg, passion fruit, peppermint, pine needle, plum, rose geranium, Bulgarian rose, rosemary, sage, sandalwood, tea tree, vanilla, yuzu, and ylang ylang hydrosols.

In order to avoid any ambiguity, the composition may also comprise surfactants. Without being bound by any theory, the applicant anticipates that the presence of surfactant may improve the compatibility of less polar fragrance ingredients with the present invention. However, it is preferable that the amount of such surfactants is kept as low as possible, because of the fact that these substances are not volatile and therefore may remain in the reservoir of the air freshener device after evaporation of the composition.

In preferred embodiments of the present invention, the composition has less than 5 wt.-%, more preferably less than 3 wt.-%, even more preferably less than 2 wt.-%, even still more preferably less than 1 wt.-%, surfactant, based on the total weight of the composition.

In particular embodiments, the less than 5 wt.-%, preferably less than 3 wt.-%, more preferably less than 2 wt.-%, even more preferably less than 1 wt.-%, of surfactants include non-ionic surfactants and mixtures of non-ionic surfactants and ionic or zwitterionic surfactants.

Preferred non-ionic surfactants include C8-C18 alkyl ethoxylates and fatty acid ethoxylates, with about 1-22 ethylene oxide units, alkyl dialkyl amine oxides, alkanoyl glucose amides, alkyl polygycosides and alkyl polyglycerides, polysorbates and sorbitan esters. Particularly preferred non-ionic surfactants include the condensation products of C12-C13 linear alcohols with approximatively 1, 2, 3, 5 or 6.5 moles of ethylene oxide (for example Neodol™ 23-1, 23-2, 23-3, 23-5 and 23-6.5, ex Shell), the condensation products of C9 to C11 linear alcohols with approximatively 2.5, 6 or 8 moles of ethylene oxide (for example Neodol™ 91-2.5, 91-6 and 91-8, ex Shell), the condensation products of C11-C15 linear secondary alcohols with approximatively 7 or 12 moles of ethylene oxide (for example Tergitol™ 15-S-7 or Tergitol™ 15-S-12, ex Dow), the condensation products of short chain alkyl alcohol with 3, 5, 6, 7, 8 or 11 moles ethylene oxide (for example Lutensol™ ON 30, 50, 60, 70, 80 and 110, ex BASF), the condensation products of iso-C13 alcohol and 3, 5, 6, 6.5, 7, 8, 10, 12, 15 or 20 moles ethylene oxide (for example Lutensol™ TO range, ex BASF) the condensation products of C12 alcohol with approximatively 1 mole of propyl-ene oxide and approximately 9 moles of ethylene oxide (for exemple Eumulgine™ L CO 40, CO 60 and CO 410, ex BASF), and the condensation products of hydrogenated castor oil with 40 or 60 moles of ethylene oxide (for example (Cremophor™, RH 40, RH 60 and RH 410, ex BASF).

Preferred anionic surfactants include alkyl benzene sulfonates (for example sodium do-decyl benzene sulfonate), sodium alkyl ether sulfates and sodium alkyl sulfates (for example sodium lauryl sulfate).

Preferred zwitterionic surfactants include lauramine oxide (for example Empigen OB, ex Innospec). The composition may also comprise hydrotropes, such as sodium cumene sulfonate and sodium xylene sulfonate, sodium alkyldiphenyloxide disulfonate, such as DOWFAX™ 2A1 and Dowfax 3B2.

In a second aspect, the present invention provides a method for obtaining a homogeneous composition, in particular a composition as described herein above, the method comprising the steps of:
  a) Providing a fragrance comprising at least one fragrance ingredient;
  b) Admixing the fragrance provided in step (a) with (2,2-dimethyl-1,3-dioxolan-4-yl)methanol, and optionally one or more compounds selected from the group consisting of dipropylene glycol (mixture of 2,2'-oxydi-1-propanol, 1,1'-oxydi-2-propanol and 2-(2-hydroxypropoxy)-1-propanol isomers), triethyl citrate (triethyl 2-hydroxypropane-1,2,3-tricarboxylate) and triacetin (1,2,3-triacetoxy propane), and water, in such a way that the sum of the concentrations of the fragrance, the one or more solvents and the water is equal to 100 wt.-%, forming thereby a composition;

c) Determining whether the composition formed in step (b) is homogeneous or phase separated;

d) Locating the composition on a ternary diagram and labelling as homogeneous or phase separated;

e) Repeating steps (a) to (d) by varying the concentrations of the fragrance, with (2,2-dimethyl-1,3-dioxolan-4-yl) methanol, and optionally one or more compounds selected from the group consisting of dipropylene glycol (mixture of 2,2'-oxydi-1-propanol, 1,1'-oxydi-2-propanol and 2-(2-hydroxypropoxy)-1-propanol isomers), triethyl citrate (triethyl 2-hydroxypropane-1,2,3-tricarboxylate) and triacetin (1,2,3-triacetoxy propane), and the water, until the realm of corresponding homogeneous compositions can be delimited in a ternary phase diagram;

f) Selecting a homogeneous composition within the realm determined in step e).

Furthermore, the present invention provides a consumer product comprising the composition according to the invention.

In preferred embodiments of the present invention, the consumer product comprising the composition according to the present invention is an active air freshener device and/or a passive air freshener device or a cartridge or refill for use in an active air freshener device and/or a passive air freshener device.

In particular, the active air freshener device is any air freshener device in which heat is applied to promote evaporation of air freshening compositions comprising a fragrance, wherein, in the context of the present disclosure, the air freshening composition is liquid. Such devices include especially so-called liquid electrical plug-in air fresheners, where the liquid is conducted through a porous wick to an electrically heated emanating surface, comprising optionally a fan. However, other devices may also be considered in the context of this invention, wherein an open reservoir, such as a cup, is heated by an electrical resistance, thermo-element, a votive candle flame, a gas flame, and the like. Active air fresheners operate at various temperatures higher than room temperature.

The operating temperature of such active air freshener devices is 45±5° C., more particularly 60° C.±5° C., even more particularly 65° C.±5° C., more particularly still 70° C.±5° C. and more particularly still above 80° C. During operation, the air freshening composition evaporates and is transported to the surroundings by diffusion and convection.

The efficiency of an active air freshener device is determined by the amount of composition released to an atmosphere during a certain period of time, for example 30 days or 40 days or 60 days. During this period of time, which is also referred as the life time of the air freshener, it is expected that the following conditions are fulfilled: (i) The rate of composition release into the atmosphere is continuous and nearly constant, that is, the rate release does not change significantly with time. Indeed, typically a constant rate of evaporation from an active air-freshener device is the loss to evaporation lies with a range of about 0.3 gram/day to about 0.8 gram/day; (ii) The profile of the fragrance emitted by the composition remains nearly constant, i.e. the odor character of the fragrance remains essentially unchanged over time and (iii) The composition is released in such a way that the totality of the fragrance ingredients has evaporated during the lifetime of the air freshener, i.e. there is no fragrance residue left in the device.

In a third aspect, the invention provides the use of the composition according to the present invention to release a fragrance in an atmosphere in a controlled way, in particular in an activated air freshening device and/or a passive air freshening device, more particularly in an electrical plug-in air freshening device capable of providing the fragrance composition to the air.

The present disclosure also relates to a method of releasing a fragrance in an atmosphere in a controlled way by evaporating a composition according to the present invention, in particular in an activated air freshening device and/or a passive air freshening device, more particularly in an electrical plug-in equipped with an emanating surface capable of providing the fragrance composition to the air.

Whereas isopropylidene glycerol is particularly suitable for the sake of the present disclosure, the selection of solvent may be extended to one or more of other solvents, natural solvents or derived natural solvents, or mixtures thereof, wherein Equation 1, may be generalized according to Equation 3.

$$W(\%) = (A)\exp^{((B)(C\log P))} \quad \text{(Equation 3)}$$

The parameters A and B in Equation 3 are specific to the one or more solvents, natural solvents or derived natural solvents, or mixture thereof, and may be determined experimentally by performing the method described in below Example 1.

With regard to a further aspect of the present disclosure, owing to the growing concern related to volatile organic carbon, effort has been made to reduce the solvent content of air freshener compositions. For example, EP 0 462 605 A2 discloses an aqueous composition for controlled evaporation of a mixture comprising water, fragrance, and of 3-methyl-3-methoxybutanol or an ester thereof, as evaporation regulating and fragrance solubilizing solvent.

3-methyl-3-methoxybutanol, like most of the conventional solvents used in air fresheners, is a petrochemical solvent, derived from non-renewable fossil resources, whereas today consumers tend to prefer products based on sustainable ingredients that are either sourced from renewable feedstocks or at least derived from renewable feedstock.

It is therefore desirable to provide air freshener compositions, wherein 3-methyl-3-methoxybutanol and other petrochemical solvents are fully or at least partially replaced by solvents derived from natural, renewable feedstocks.

Therefore, the present disclosure provides a composition comprising at least one fragrance ingredient, one or more natural solvents or derived natural solvents, and water.

In this context, the terms "natural solvent" or "derived natural solvent" refers to a solvent that fulfils the technical definitions and criteria for natural and organic cosmetic ingredients and products set forward by the International Standard ISO 16128-1 norm, first edition, dated Feb. 15, 2016.

According to this norm, the one or more natural solvents include:

Solvents that have been obtained from plants by physical process, such as distillation, extraction, incision or expression, without intentional chemical modification; and Solvents that have been obtained by fermentation reactions occurring in nature and leading to molecules which occur in nature.

Similarly, the one or more derived natural solvents of the present disclosure include solvents that have been obtained through chemical and/or biological processes, listed hereinafter, with the intention of chemical modification and having, in their chemical structure, moieties of natural origin at an extent such that:

The molecular weight of the moieties of natural origin accounts for more than 50% of the molecular weight of the solvent chemical structure; or The number of carbon atoms constituting the moieties of natural origin, referred to as renewable carbon, accounts for more than 50% of the total number of carbon constituting the solvent chemical structure.

The ISO 16128-1 norm provides a list of chemical reactions that may be used to manufacture derived natural ingredients. These reactions include acylation, including amidation and esterification; addition, including hydration; calcination or carbonization; C/O/N-alkylation, including etherification and amination; carbonation; condensation, including aldol reactions, Knoevenagel, Claisen and Guerbet condensations; enzymatic and micro-biological processes, excluding natural fermentation; glycosidation; hydrogenation; hydrogenolysis; hydrolysis, including saponification; ion exchange, including neutralization; olefin metathesis; oxidation; phosphorylation; reduction and sulfatation.

Compounds of natural origin differ from petrochemicals derived from fossil oils by their carbon isotope distribution, in particular by their $^{12}C$ to $^{14}C$ radioisotopes ratio. Therefore, the natural origin of any compound may be confirmed by performing a radioactive carbon analysis, according to methods known to the art. For example, a radioactive carbon analysis may be performed using ASTM 6866-05.

The way the percentage of natural origin is calculated is shown in ISO 16128-1 norm and is illustrated for selected solvents hereinafter. The percentage of natural origin is referred to as "natural origin value" (NOV) hereinafter.

Preferred solvents in the present context are solvents that improve the affinity of the at least one fragrance ingredient and the water/solvent mixtures and regulate the evaporation rate of the composition.

Preferably, the weighted average natural origin value of the one or more natural solvents or derived natural solvents <NOVS> is greater than 50%, preferably greater than 60%.

By "weighted average natural origin value" is meant that the natural origin value of the one of more solvents (NOVS) is multiplied by the percentage of the one or more solvents, based on the total weight of the one or more solvents present in the composition, and that this product is summed over all solvents present in the composition, i.e.

$$\langle NOVS \rangle = \frac{\sum_{i=1}^{N} c_{s,i} NOVS_i}{\sum_{i=1}^{N} c_{s,i}} \quad \text{(Equation 4)}$$

where $c_{s,i}$ is the percentage of solvent i by weight, based on the total weight of the composition, $NOVS_i$ is the natural origin value of this solvent i and N is the total number of solvents in the composition.

Preferably, the weighted average natural origin value of the composition <NOVC> is greater than 50%, preferably greater than 60%, wherein <NOVC> is given by Equation 5:

$$\langle NOVC \rangle = \frac{\sum_{i=1}^{N} c_{s,i} NOVS_i + c_w 100 + \sum_{j=1}^{M} c_{f,j} NOVF_j}{100} \quad \text{(Equation 5)}$$

where $c_{s,i}$ is the percentage of solvent i by weight, based on the total weight of the composition, $NOVS_i$ is the natural origin value of this solvent i and N is the total number of solvents in the composition; $c_w$ is the percentage of water with natural origin value of 100; $c_{f,j}$ is the percentage of fragrance ingredient j by weight, based on the total weight of the composition, $NOVF_j$ is the natural origin value of this fragrance ingredient j and M is the total number of fragrance ingredients in the composition.

Derived natural solvents that are particularly suitable include glycerol formal ((1,3-dioxolan-4-yl)methanol and/or 1,3-dioxan-5-ol), isopropylidene glycerol ((2,2-dimethyl-1,3-dioxolan-4-yl)methanol), (2-isopropyl-2-methyl-1,3-dioxolan-4-yl)methanol, triethyl citrate (triethyl 2-hydroxypropane-1,2,3-tricarboxylate), acetyl tributyl citrate (tributyl 2-acetoxypropane-1,2,3-tricarboxylate), triacetin (1,2,3-triacetoxypropane), 1,2-propanediol, 1,3-propanediol and isosorbide (3,6-dimethoxyhexahydrofuro[3,2-b]furan).

Preferably, the derived natural solvents are selected from the group consisting of isopropylidene glycerol ((2,2-dimethyl-1,3-dioxolan-4-yl)methanol), triethyl citrate (triethyl 2-hydroxypropane-1,2,3-tricarboxylate), and triacetin (1,2,3-triacetoxypropane).

Isopropylidene glycerol ((2,2-dimethyl-1,3-dioxolan-4-yl)methanol) may be obtained from the condensation of natural glycerol and acetone. The percentage of natural origin of this solvent is obtained from the ratio of the molecular weight of the glyceryl moiety (90 g/mol) by the total molecular weight of isopropylidene glycerol (132 mol/g), yielding a 68% natural origin value for this solvent, if obtained by this way.

Triethyl citrate (triethyl 2-hydroxypropane-1,2,3-tricarboxylate) may be obtained from the esterification of natural citric acid and natural ethanol, which would confer a 100% natural origin to this solvent, if obtained by this way.

Triacetin (1,2,3-Triacetoxypropane) citrate may be obtained from the esterification of natural glycerin and natural acetic acid, which would confer a 100% natural origin to this solvent, if obtained by this way.

The following combination of features forms part of the present disclosure:

A. A composition comprising at least one fragrance ingredient, one or more natural solvents or derived natural solvents, and water.

B. The composition according to combination A, wherein the weighted average natural origin value of the one or more natural solvents or derived natural solvents is greater than 50%, preferably greater than 60%.

C. The composition according to one of combinations A or B, wherein the weighted average natural origin value of composition is greater than 50%%, preferably greater than 60%.

D. The composition according to one of combinations A to C, wherein the one or more natural solvents or derived natural solvents is selected from the group consisting of (1,3-dioxolan-4-yl)methanol, 1,3-dioxan-5-ol, (2,2-dimethyl-1,3-dioxolan-4-yl)methanol, (2-isopropyl-2-methyl-1,3-dioxolan-4-yl)methanol, triethyl 2-hydroxypropane-1,2,3-tricarboxylate, 1,2,3-triacetoxypropane, 1,2-propanediol, 1,3-propanediol and 3,6-dimethoxyhexahydrofuro[3,2-b]furan, preferably from the group consisting of (2,2-dimethyl-1,3-dioxolan-4-yl)methanol, tributyl 2-acetoxypropane-1,2,3-tricarboxylate, triethyl 2-hydroxypropane-1,2,3-tricarboxylate and 1,2,3-triacetoxypropane.
E. A composition according to one of combinations A to D, comprising at least one fragrance ingredient, (2,2-dimethyl-1,3-dioxolan-4-yl)methanol and water.
F. The composition according to combination E, comprising, preferably consisting of:
   a) From 5 to 40 wt.-%, preferably from 10 to 30 wt.-%, of at least one fragrance ingredient;
   b) From 20 to 90 wt.-%, preferably from 40 to 85 wt.-%, more preferably from 60 to 80 wt.-%, of (2,2-dimethyl-1,3-dioxolan-4-yl)methanol; and
   c) From 5 to 40 wt.-%, preferably 10 to 35 wt.-%, still more preferably 15 to 25 wt.-% of water.
G. The composition according to one of combinations E or F, additionally comprising one or more compounds selected from the group consisting of dipropylene glycol (mixture of 2,2'-oxydi-1-propanol, 1,1'-oxydi-2-propanol and 2-(2-hydroxypropoxy)-1-propanol isomers), triethyl 2-hydroxypropane-1,2,3-tricarboxylate and 1,2,3-triacetoxy propane.
H. The composition according to combination G, comprising, preferably consisting of:
   a) From 10 to 30 wt.-%, preferably from 15 to 25 wt.-%, of at least one fragrance ingredient;
   b) From 40 to 80 wt.-%, preferably from 50 to 70 wt.-%, of compounds selected from the group consisting of (2,2-dimethyl-1,3-dioxolan-4-yl)methanol, dipropylene glycol (mixture of 2,2'-oxydi-1-propanol, 1,1'-oxydi-2-propanol, and 2-(2-hydroxypropoxy)-1-propanol isomers), triethyl 2-hydroxypropane-1,2,3-tricarboxylate and 1,2,3-triacetoxy propane; and
   c) From 10 to 35 wt.-%, preferably 15 to 25 wt.-%, of water.
I. The composition according to one of combinations A to H, wherein the maximum level of water in the composition is given by Equation 3:

$$W(\%) = (A) \exp^{((B)(ClogP))} \quad \text{(Equation 3)}$$

Wherein (ClogP) is the weighted average ClogP of the at least one fragrance ingredient, wherein A is preferably 63±30 and/or B is preferably −0.38±0.025.
J. The composition according to one of combinations A to I, comprising at least two fragrance ingredients.
K. The composition according to one of combinations A to J, wherein the weighted average ClogP of the at least one fragrance ingredient or at least two fragrance ingredients, respectively, is 4 or less, preferably 3.5 or less, more preferably 3.0 or less, based on the total weight of the at least one fragrance ingredient present in the composition.
L. The composition according to combinations J or K, wherein at least 70 wt.-%, preferably at least 80 wt.-%, more preferably at least 90 wt.-%, of the at least one fragrance ingredient or at least two fragrance ingredients, respectively, have a ClogP of 4 or less.
M. The composition according to one of combinations J to L, wherein less than 30 wt.-% preferably less than 20 wt.-%, more preferably less than 10 wt.-% of the at least one fragrance ingredient or at least two fragrance ingredients, respectively, have a ClogP of 4 or more.
N. The composition according to one of combinations A to M, further comprising at least one fragrance filler selected from the group consisting of diethyl propanedioate, ethyl 3-oxobutanoate, benzyl alcohol, 2-phenylethanol, tetrahydro-4-methyl-2-(2-methylpropyl)-2H-pyran-4-ol, benzaldehyde, benzyl acetate, 3-methylbutyl acetate, 1-phenylethyl acetate, 2-(4-methylcyclohex-3-en-1-yl)propan-2-ol, 3aR,6S,7aS)-3a,4,5,6,7,7a-hexahydro-1H-4,7-methanoinden-6-yl acetate, (2,6-dimethyloct-7-en-2-ol, -ethyl hexanoate, 3,7-dimethylocta-1,6-dien-3-ol); hexyl acetate, (E)-3,7-dimethylnona-1,6-dien-3-ol, 3,7-dimethyloct-6-en-3-ol, ethyl heptanoate, 2-(sec-butyl)cyclohexanone, 2,6-dimethyloct-7-en-2-ol, 3,7-dimethyloctan-3-ol, 2,6-dimethyloctan-2-ol, 7-isopropyl-8,8-dimethyl-6,10-dioxaspiro[4.5]decane, 3-(2-methylpropyl)-1-methylcyclohexanol, (2S,4S)-1,7,7-trimethylbicyclo[2.2.1]heptan-2-yl acetate.
O. The composition according to one of combinations A to N, comprising at least one hydrosol selected from the group consisting of blackcurrant, camphor, celery seed, chamomile, cinnamon, clove, copal, cypress, eucalyptus, fennel, ginger, helichyrsum, jambora, jasmine, juniper berries, lemongrass, lavender, lemon, lime, *litsea cubeba*, mint, myrrh, neroli, nutmeg, passion fruit, peppermint, pine needle, plum, rose geranium, Bulgarian rose, rosemary, sage, sandalwood, tea tree, vanilla, yuzu, and ylang ylang hydrosols.
P. The composition according to one of combinations A to O, comprising less than 2 wt.-%, preferably less than 1 wt.-%, of surfactants.
Q. A method of obtaining a homogeneous composition, in particular a composition according to one of combinations A to P, the method comprising the steps of:
   a) Providing a fragrance comprising at least one fragrance ingredient;
   b) Admixing the fragrance provided in step (a) with (2,2-dimethyl-1,3-dioxolan-4-yl)methanol, and optionally one or more compounds selected from the group consisting of dipropylene glycol (mixture of 2,2'-oxydi-1-propanol, 1,1'-oxydi-2-propanol and 2-(2-hydroxypropoxy)-1-propanol isomers), triethyl 2-hydroxypropane-1,2,3-tricarboxylate and triacetin (1,2,3-triacetoxy propane), and water, in such a way that the sum of the concentrations of the fragrances, the one or more solvents and the water is equal to 100 wt.-%, forming thereby a composition;
   c) Determining whether the composition formed in step (b) is homogeneous or phase separated;
   d) Locating the composition on a ternary diagram and labelling as homogeneous or phase separated;
   e) Repeating steps (a) to (d) by varying the concentrations of the fragrance, with the (2,2-dimethyl-1,3-dioxolan-4-yl)methanol, and optionally one or more compounds selected from the group consisting of dipropylene glycol (mixture of 2,2'-oxydi-1-propanol, 1,1'-oxydi-2-propanol and 2-(2-hydroxypropoxy)-1-propanol isomers), triethyl 2-hydroxypropane-1,2,3-tricarboxylate and triacetin (1,2,3-triacetoxy propane), and the water, until the realm of corresponding homogeneous compositions can be delimited in a ternary phase diagram;
   f) Selecting a homogeneous composition within the realm determined in step e).
R. A consumer product comprising the composition according to one of combinations A to P.
S. The consumer product according to combination R, wherein the consumer product is an air freshening product, in particular an activated air freshening device and/or a passive air freshening device, or a cartridge or refill for use in an active air freshener device and/or a passive air freshener device.

T. The consumer product according to combination S, wherein the activated air freshening device is an electrical plug-in air freshening device capable of providing the fragrance composition to the air.

U. A use of a composition according to one of combinations A to P for releasing a fragrance in an atmosphere in a controlled way, in particular in an activated air freshening device and/or a passive air freshening device, more particularly in an electrical plug-in air freshening device capable of providing the fragrance composition to the air.

Further features and particular advantages of the present invention become apparent from the Figures and the following examples.

It is shown in.

EXAMPLE 1: DETERMINATION OF OPTIMAL COMPOSITIONS

In a first step, a series of fragrances were prepared by admixing fragrance ingredients. The weighted average ClogP of each fragrance was calculated using Equation 2. Forming 8 different fragrances, the weighted average ClogP was between 1.29 and 3.56 (Table 1).

TABLE 1

Fragrances utilized in this example with their weighted average ClogP

| | A | B | C | D | E | F | G | H | ClogP |
|---|---|---|---|---|---|---|---|---|---|
| DIPROPYLENE GLYCOL | 0.5 | | 1.0 | | | | | | −0.7 |
| ACETOACET ETHYLE | 7.0 | 28.0 | | 23.5 | 73.0 | | | | 0.3 |
| TRIETHYL CITRATE | | | | 0.9 | | 0.8 | 7.0 | 2.0 | 1.2 |
| ALC PHENYL ETHYLIQUE | 2.4 | 3.4 | 5.9 | | | | 5.0 | 6.0 | 1.3 |
| FLOROSA HC | | 15.0 | 16.0 | 2.0 | | | | | 1.4 |
| COUMARINE PURE CRIST | | | 2.0 | 0.8 | | | | 0.6 | 1.4 |
| HYDROXYCITRONELLAL SYNT | | 1.5 | | | | | | | 1.5 |
| ALC CINNAMIQUE SYNT | | 0.3 | | 0.8 | 2.0 | | | | 1.6 |
| ALC PHENYL PROPYLIQUE | | | | 3.0 | 1.0 | | | | 1.7 |
| AUBEPINE PARA CRESOL | 2.0 | | 1.0 | 2.5 | 2.0 | | | | 1.8 |
| ETHYL VANILLINE | | 0.5 | 0.4 | 2.5 | 1.5 | | 1.7 | 0.2 | 1.8 |
| ACET BENZYLE | 31.0 | 3.0 | 22.0 | 13.0 | | | | | 2.0 |
| ALD CINNAMIQUE | 0.7 | | | 2.0 | | 2.3 | | | 2.0 |
| METHYL-2-BUTYRATE ETHYLE | | | | 2.0 | | 2.3 | | | 2.1 |
| CARVONE LAEVO | | | | 1.5 | | 3.0 | | | 2.2 |
| CAMPHOR | 1.0 | 1.0 | | | | 8.0 | | | 2.2 |
| GARDENOL | | | 1.0 | 5.0 | | | | | 2.3 |
| PHENYL ETHYL ACETATE | | | | 5.0 | | | 1.0 | 1.0 | 2.3 |
| CYCLAL C | 2.5 | | | | | | | | 2.4 |
| DECALACTONE GAMMA | | 1.5 | | | | | | | 2.4 |
| MAGNOLAN | 1.3 | | | 2.0 | | | | | 2.4 |
| EUGENOL | | | | 2.1 | | 0.9 | 0.3 | 0.3 | 2.4 |
| MANZANATE | 0.5 | | | 1.5 | | | | 1.0 | 2.6 |
| TERPINEOL ALPHA | 1.0 | | 0.5 | | | 2.0 | 1.0 | | 2.6 |
| LINALOOL | | 7.0 | 11.0 | 3.0 | | 3.0 | 3.0 | 3.0 | 2.7 |
| ACET HEXYLE | | 0.2 | 1.0 | 1.0 | | 3.0 | | | 2.8 |
| HEDIONE | 0.8 | 2.5 | 4.6 | 2.3 | 0.8 | 11.0 | 12.6 | 10.3 | 2.9 |
| JASMACYCLENE | 1.0 | | | 1.5 | | 7.0 | 2.0 | 4.0 | 2.9 |
| PECHE PURE | | 0.1 | 2.0 | 1.0 | | 2.0 | 4.0 | 2.0 | 2.9 |
| CITRAL LEMAROME N | 1.0 | 1.0 | | | | 8.0 | | | 2.9 |
| GERANIOL | 5.0 | | 4.0 | 1.0 | | 4.0 | 2.0 | 1.0 | 3.0 |
| CINNAMATE ETHYLE | | | | 1.0 | | 1.0 | | | 3.0 |
| BRASSYLATE ETHYLENE | | 6.0 | | | | 2.0 | 7.7 | 7.0 | 3.0 |
| DIHYDRO MYRCENOL | | 4.0 | 4.3 | | | 3.0 | | | 3.0 |
| ETHYL LINALOL | 11.1 | | | | | 6.0 | 2.5 | 5.2 | 3.3 |
| CITRONELLOL | | 13.5 | 1.0 | | | 4.4 | | | 3.3 |
| FLOROCYCLENE | 5.0 | | | | | | | | 3.4 |
| OENANTHATE ETHYLE | 1.0 | | | 1.5 | | 4.0 | | | 3.4 |
| TETRAHYDRO LINALOL | 7.5 | | | | | 2.5 | 7.0 | 7.0 | 3.5 |
| ACET LINALYLE SYNT | 4.0 | 3.6 | | 2.4 | | 4.0 | 7.0 | 5.0 | 3.7 |
| FLORHYDRAL | 1.5 | | | | 2.0 | | | | 3.7 |
| IONONE BETA | 0.7 | 0.5 | | 0.7 | | 0.6 | 3.0 | 1.0 | 3.8 |
| ISORALDEINE 70 | 2.0 | | 2.4 | 2.0 | | 3.5 | 1.8 | 3.3 | 4.0 |
| AGRUMEX | 0.5 | | 3.0 | 11.0 | | 5.0 | | 3.2 | 4.1 |
| SALICYLATE BENZYLE | 1.2 | 2.6 | 2.0 | 0.6 | | | 5.7 | 3.0 | 4.2 |
| CASHMERAN | | | | 2.0 | 4.6 | | | | 4.2 |
| ACET CITRONELLYLE | 2.7 | | | | | | | | 4.2 |
| NYMPHEAL | | | | 3.7 | | | | | 4.3 |
| SYLKOLIDE | 1.3 | | 2.0 | 0.3 | 3.9 | | | | 4.4 |
| TERPINENE GAMMA | | | | 1.4 | | 3.8 | | | 4.4 |
| ALD A AMYL CINNAMIQUE | 1.0 | 0.8 | | | | | 10.0 | 10.0 | 4.5 |
| SALICYLATE HEXENYLE-3-CIS | 2.8 | 1.1 | | | | | | 2.0 | 4.5 |

TABLE 1-continued

Fragrances utilized in this example with their weighted average ClogP

| | A | B | C | D | E | F | G | H | ClogP |
|---|---|---|---|---|---|---|---|---|---|
| ISO E SUPER | | | 4.8 | 0.6 | | | 2.7 | 5.0 | 4.9 |
| SERENOLIDE | | 2.9 | 1.0 | | 9.2 | 0.6 | 3.0 | 6.9 | 5.4 |
| ACET P T BUTYL CYCLOHEXYLE | | | | | | | 10.0 | 10.0 | 4.1 |
| FRESKOMENTHE | | | | | | 2.3 | | | 2.8 |
| Average ClogP | 2.64 | 2.04 | 2.60 | 2.09 | 1.29 | 3.04 | 3.31 | 3.56 | |

The distribution of ClogP values within each fragrance is represented in Table 2, emphasizing the proportion of ingredients having ClogP values within pre-defined ranges.

TABLE 2

Distribution of ClogP values within the fragrances of Table 1

| ClogP | A | B | C | D | E | F | G | H |
|---|---|---|---|---|---|---|---|---|
| <=0 | 0.50 | 0.00 | 1.00 | 0.00 | 0.00 | 0.00 | 0.00 | 0.00 |
| 0-1 | 7.00 | 28.00 | 0.00 | 23.50 | 73.00 | 0.00 | 0.00 | 0.00 |
| 1-2 | 35.40 | 23.70 | 47.30 | 25.50 | 6.50 | 0.80 | 13.70 | 8.80 |
| 2-3 | 14.80 | 13.30 | 24.10 | 31.90 | 0.80 | 59.80 | 25.90 | 22.60 |
| 3-4 | 30.80 | 27.60 | 5.30 | 4.60 | 2.00 | 26.50 | 27.20 | 25.20 |
| 4-5 | 11.50 | 4.50 | 21.30 | 14.50 | 8.50 | 12.30 | 30.20 | 36.50 |
| >5 | 0.00 | 2.90 | 1.00 | 0.00 | 9.20 | 0.60 | 3.00 | 6.90 |
| Total | 100.00 | 100.00 | 100.00 | 100.00 | 100.00 | 100.00 | 100.00 | 100.00 |
| Average ClogP | 2.64 | 2.04 | 2.60 | 2.09 | 1.29 | 3.04 | 3.31 | 3.56 |

Figure 1:
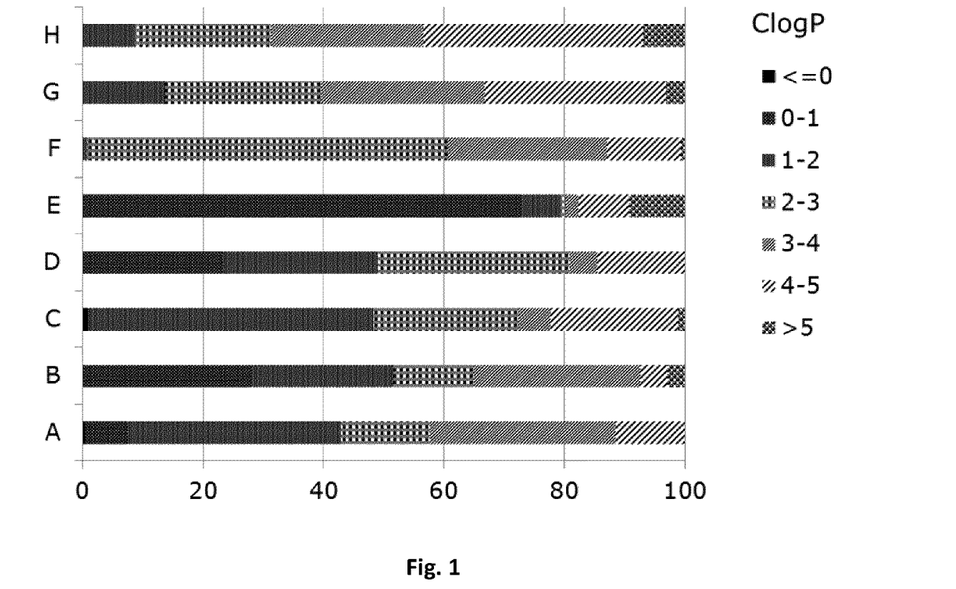
FIG. 1: Distribution of ClogP values in fragrances A to H, used in the examples.

The distributions of Table 2 are visualized graphically in FIG. 1. Both Table 2 and FIG. 1 show the diversity of the fragrances in terms of the ClogP ranges represented.

In a second step, each fragrance was combined with isopropylidene glycerol and deionized water in variable proportions in such a way that the sum of the weight percentages was always 100%. A number of 9 to 12 different compositions were obtained in this way.

In a third step, the locations of all compositions for each fragrance compositions were reported on a ternary phase diagram.

Figure 2:
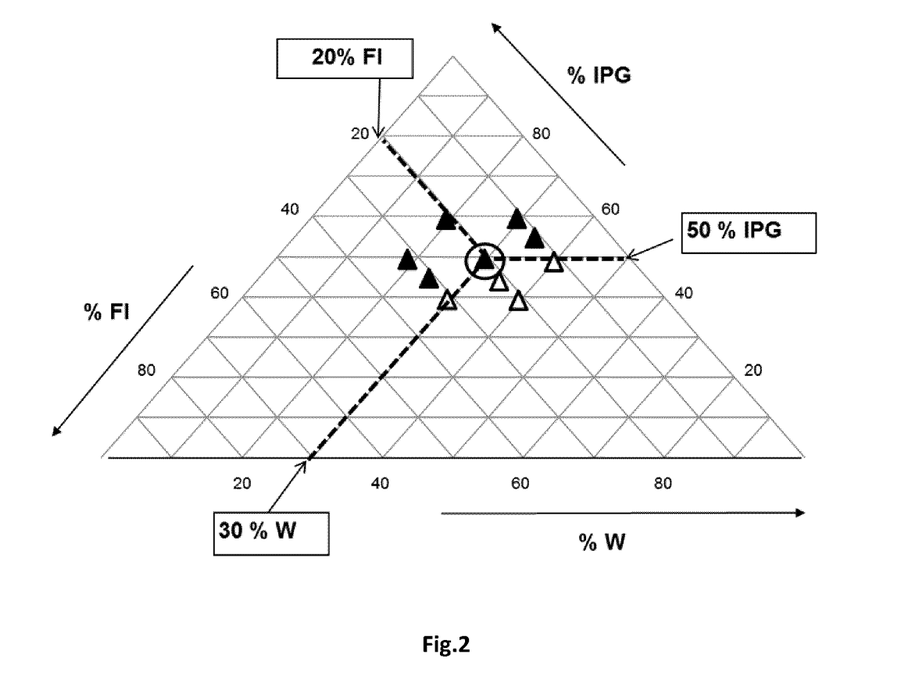
FIG. 2: Ternary diagram corresponding to fragrance D (weighted average ClogP=2.04)
Figure 3:
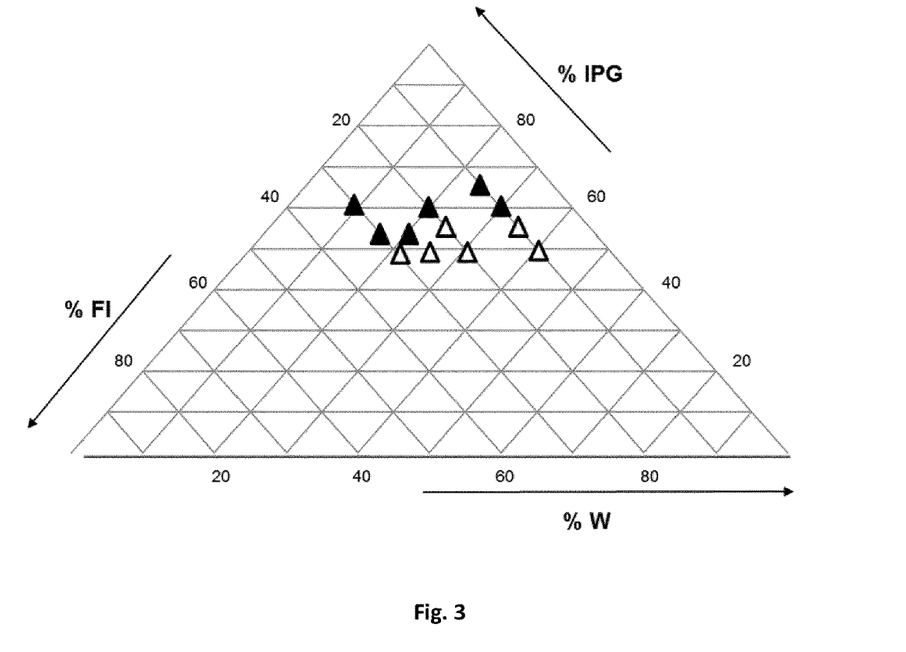
FIG. 3: Ternary diagram corresponding to fragrance F (weighted average ClogP=3.04)
Figure 4:
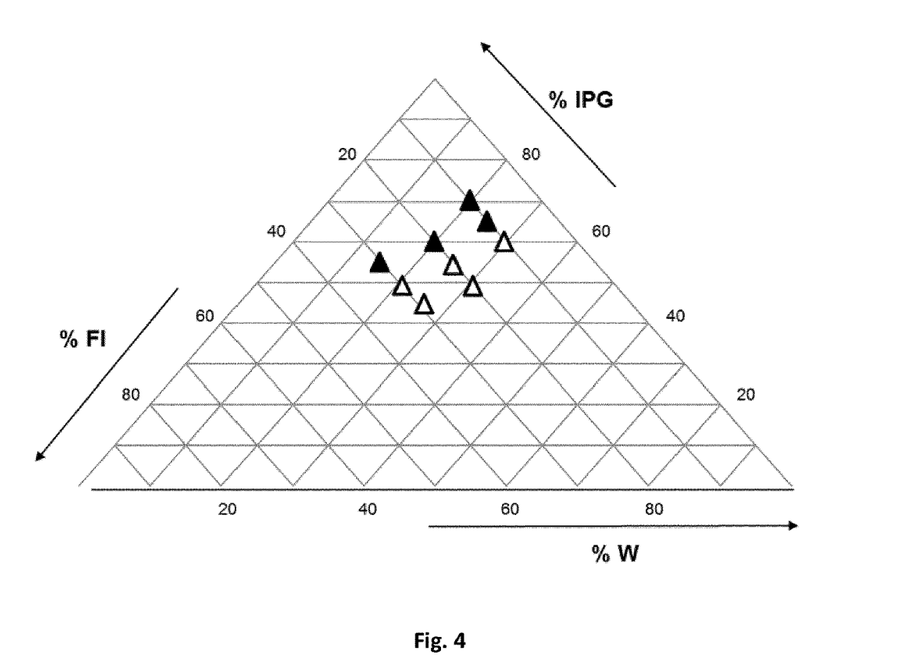
FIG. 4: Ternary diagram corresponding to fragrance H (weighted average ClogP=3.56)

As apparent from the diagrams of FIG. 2 to 4, increasing the weighted average ClogP of the fragrance, the realm of the diagram where the composition is homogeneous is shifted in the direction of low water and high isopropylidene glycerol concentrations. Concomitantly, the extension of this homogeneous realm decreases, confirming the decrease of affinity of the fragrance with the isopropylidene glycerol/water solvent system.

FIG. 2 also shows the concentration coordinate of each of the three components (isopropylidene glycerol {IPG}, fragrance {FI} and water {W}) are read on such ternary diagram.

EXAMPLE 2: EXAMPLES OF COMPOSITIONS ACCORDING TO THE INVENTION WITH ISOPROPYLIDENE GLYCEROL

A series of homogeneous and water-clear compositions were prepared having the concentrations shown in Table 3.

TABLE 3

Homogeneous and water-clear compositions according to the present invention with isopropylidene glycerol

| | Fragrance (average ClogP) | Fragrance [%] | Isopropylidene glycerol [%] | Water [%] |
|---|---|---|---|---|
| I | E (1.29) | 30 | 45 | 25 |
| II | B (2.04) | 30 | 50 | 20 |
| III (limit, see text) | C (2.60) | 10 | 50 | 40 |
| IV | C (2.60) | 10 | 55 | 35 |
| V | C (2.60) | 20 | 60 | 20 |
| VI | F (3.07) | 20 | 60 | 20 |
| VII | H (3.56) | 20 | 60 | 20 |
| VIII | H (3.56) | 10 | 25 | 65 |

As apparent from Table 3, homogeneous and water-clear compositions may be obtained with up to 30 wt.-% fragrance ingredients or up to 35 wt.-% deionized water, depending on the weighted average ClogP of the fragrance. Sample III was slightly turbid and may be therefore considered as the limit of solubility of 10 wt.-% fragrance C in the isopropylidene/water solvent system at 40 wt.-% water.

EXAMPLE 3: COMPOSITIONS ACCORDING TO THE INVENTION WITH ADDITIONAL SOLVENTS

Table 4 show a series of homogeneous and water-clear compositions comprising isopropylidene glycerol and other solvents.

TABLE 4

Homogeneous and water-clear compositions according to the present invention with solvent mixtures

| Fragrance | Fragrance (av. ClogP) | Fragrance [%] | Water [%] | IPG [%] | DPG [%] | TEC [%] | TRI [%] |
|---|---|---|---|---|---|---|---|
| IX | C (2.60) | 20 | 20 | 60 | | | |
| X | C (2.04) | 20 | 20 | 45 | 15 | | |
| XI | C (2.60) | 20 | 20 | 40 | 10 | | 10 |
| XII | C (2.60) | 20 | 20 | 30 | 20 | 10 | |
| XIII | C (2.60) | 20 | 20 | 30 | 15 | 15 | |
| XIV | F (3.04) | 20 | 20 | 60 | | | |
| XV | F (3.04) | 20 | 20 | 45 | 15 | | |
| XVI | F (3.04) | 20 | 20 | 40 | 10 | | 10 |
| XVII | F (3.04) | 20 | 20 | 30 | 20 | 10 | |

IPG = isopropylidene glycerol ((2,2-dimethyl-1,3-dioxolan-4-yl)methanol); DPG = dipropylene glycol (2,2'-oxydi-1-propanol, 1,1'-oxydi-2-propanol, and 2-(2-hydroxypropoxy)-1-propanol isomer mixture); TEC = triethyl citrate (triethyl 2-hydroxypropane-1,2,3-tricarboxylate); TRI = triacetine (1,2,3-triacetoxypropane).

Figure 5:
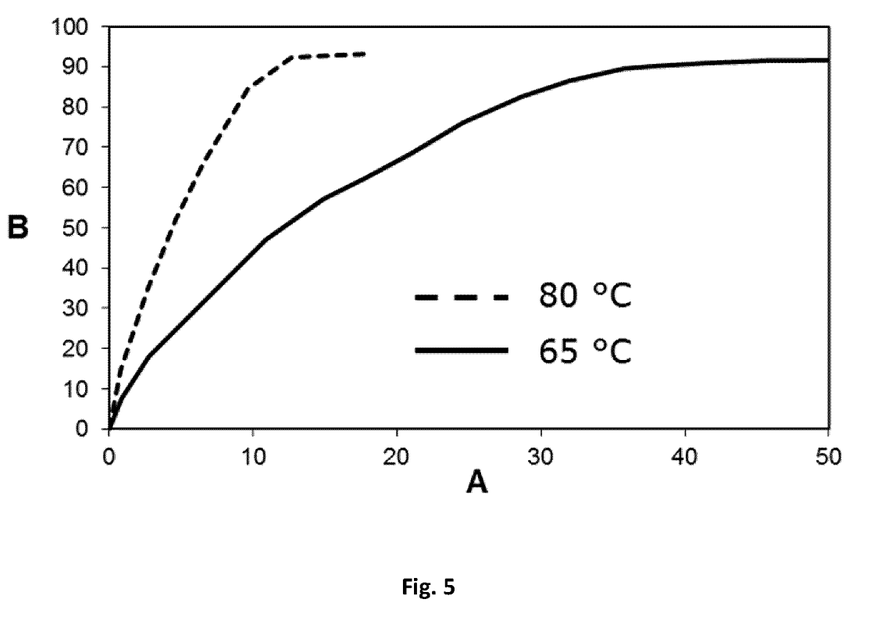
FIG. 5: Evaporation curves of composition XIV at 65° C. and 80° C.

EXAMPLE 4: EXAMPLES OF EVAPORATION CURVES 25 ml of composition XIV was transferred in the vessel of an electrical plug-in air freshener device having an operating temperature of 65° C. Another 25 ml portion of composition XIV was transferred in the vessel of another electrical plug-in air freshener device having an operating temperature of 80° C. Both devices were switched on and the evaporation process was quantified by monitoring the device weight loss as a function of time. The percentage of weight loss was calculated by applying Equation 6:

$$F(t) = [w(t_0) - w(t)]/w(t_0) \quad \text{(Equation 6)},$$

wherein $w(t)$ is the weight at a given time $t$ and $w(t_0)$ is the weight at the starting time $t_0$.

As Apparent from FIG. 5, the evaporation of composition XIV is too fast at 80° C. with respect to the desired device operational duration (at least 30 days), whereas it is optimal at 65° C. This composition is therefore well adapted to low temperature electrical plug-in devices.

Figure 6:
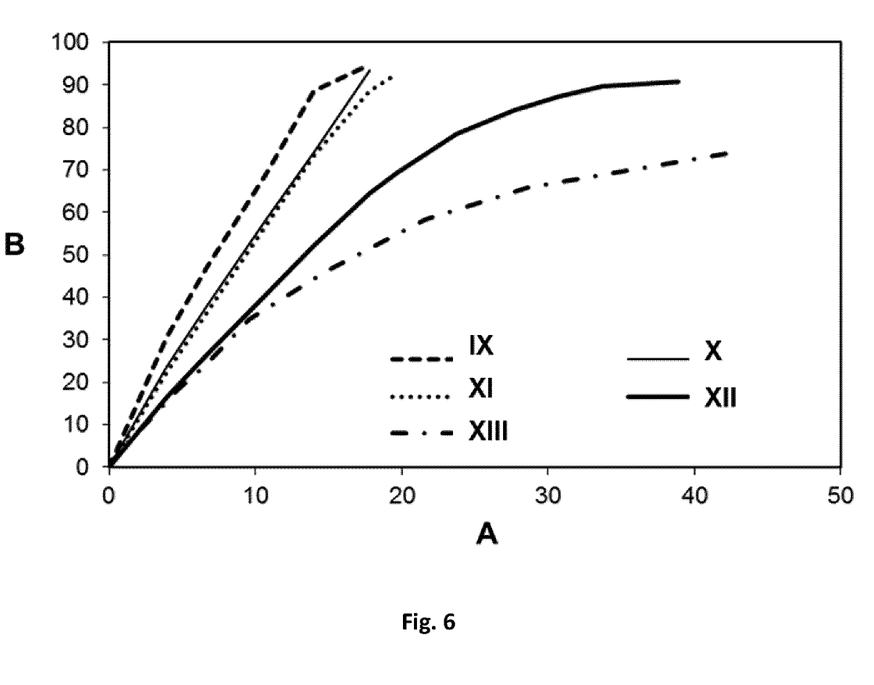
FIG. 6: Evaporation curves of compositions IX through XIII at 80° C.

In FIGS. 5 and 6 {A} means "elapsed days" and {B} means weight loss in %

The evaporation of composition IX, having same solvent composition as composition XIV is compared to the evaporation of compositions X though XIII in FIG. 6.

As apparent from FIG. 6 replacing 15 or 20 wt.-% of isopropylidene glycerol with dipropylene glycol or dipropylene glycol and triacetin only slightly decreases the rate of evaporation of the composition. The introduction of triethyl citrate has a more pronounced impact in lowering the rate of evaporation. The optimal composition is found for composition XII. These results show that it is possible to optimize the evaporation of compositions comprising a fragrance and water by selecting solvents having a sustainable environmental profile.

The invention claimed is:

1. A composition comprising:
 a) from 10 to 30 wt % of at least one fragrance ingredient;
 b) from 40 to 85 wt % of (2.2-dimethyl-1.3-dioxolan-4-yl) methanol;
 c) from 10 to 35 wt % of water; and,
 one or more compounds selected from the group consisting of: 2.2'-oxydi-1-propanol, 1,1'-oxydi-2-propanol, 2-(2-hydroxypropoxy)-1-propanol, triethyl 2-hydroxypropane-1,2,3-tricarboxylate and 1,2,3-triacetoxy propane.

2. The composition according to claim 1, comprising:
 a) from 10 to 30 wt.-% of at least one fragrance ingredient;
 b) from 40 to 80 wt.-% of compounds selected from the group consisting of:
 (2,2-dimethyl-1,3-dioxolan-4-yl) methanol, 2,2'-oxydi-1-propanol, 1,1'-oxydi-2-propanol, 2-(2-hydroxypropoxy)-1-propanol isomers, triethyl 2-hydroxypropane-1,2,3-tricarboxylate and 1,2,3-triacetoxy propane; and
 c) from 10 to 35 wt.-% of water.

3. The composition according to claim 1, comprising at least two fragrance ingredients.

4. The composition according to claim 1, wherein the weighted average ClogP of the at least one fragrance ingredient or at least two fragrance ingredients, respectively, is 4 or less based on the total weight of the at least one fragrance ingredient present in the composition.

5. The composition according to claim 1, wherein at least 70 wt.-% of the at least two fragrance ingredients or at least two fragrance ingredients, respectively, have a ClogP of 4 or less.

6. The composition according to claim 1, wherein less than 30 wt.-% of the at least one fragrance ingredient or at least two fragrance ingredients, respectively, have a ClogP of 4 or more.

7. The composition according to claim 1, further comprising at least one fragrance filler selected from the group consisting of: diethyl propanedioate, ethyl 3-oxobutanoate, benzyl alcohol, 2-phenylethanol, tetrahydro-4-methyl-2-(2-methylpropyl)-2H-pyran-4-ol, benzaldehyde, benzyl acetate, 3-methylbutyl acetate, 1-phenylethyl acetate, 2-(4-methylcyclohex-3-en-1-yl) propan-2-ol, 3aR,6S,7aS)-3a,4,5,6,7,7a-hexahydro-1H-4,7-methanoinden-6-yl acetate, (2,6-dimethyloct-7-en-2-ol,-ethyl hexanoate, 3,7-dimethyl-octa-1,6-dien-3-ol); hexyl acetate, (E)-3,7-dimethylnona-1,6-dien-3-ol, 3,7-dimethyloct-6-en-3-ol, ethyl heptanoate, 2-(sec-butyl) cyclohexanone, 2,6-dimethyloct-7-en-2-ol, 3,7-dimethyloctan-3-ol, 2,6-dimethyloctan-2-ol, 7-isopropyl-3-(2-methylpropyl)-1-methylcyclohexanol, 8,8-dimethyl-6,10-dioxaspiro [4.5] decane, 3-(2-methylpropyl)-1-methylcyclohexanol, (2S,4S)-1,7,7-trimethylbicyclo [2.2.1] heptan-2-yl acetate.

8. The composition according to claim 1, further comprising at least one hydrosol selected from the group consisting of: blackcurrant, camphor, celery seed, chamomile, cinnamon, clove, copal, cypress, eucalyptus, fennel, ginger, helichyrsum, jambora, jasmine, juniper berries, lemongrass, lavender, lemon, lime, litsea cubeba, mint, myrrh, neroli, nutmeg, passion fruit, peppermint, pine needle, plum, rose geranium, Bulgarian rose, rosemary, sage, sandalwood, tea tree, vanilla, yuzu, and ylang ylang hydrosols.

9. The composition according to claim 1, comprising less than 5 wt.-% of surfactants.

10. A method of obtaining a homogeneous composition according to claim 1, the method comprising the steps of:
 a) providing a fragrance comprising at least one fragrance ingredient;
 b) admixing the fragrance provided in step (a) with (2,2-dimethyl-1,3-dioxolan-4-yl) methanol, and optionally-one or more compounds selected from the group consisting of: 2,2'-oxydi-1-propanol, 1,1'-oxydi-2-propanol, 2-(2-hydroxypropoxy)-1-propanol, triethyl 2-hydroxypropane-1,2,3-tricarboxylate and 1,2,3-triacetoxy propane, and water, in such a way that the sum of the concentrations of the fragrance, the one or more solvents and the water is equal to 100 wt.-%, forming thereby a composition;

c) determining whether the composition formed in step (b) is homogeneous or phase separated;
d) locating the composition on a ternary diagram and labelling as homogeneous or phase separated;
e) repeating steps (a) to (d) by varying the concentrations of the fragrance, with (2,2-dimethyl-1,3-dioxolan-4-yl) methanol, and optionally-one or more compounds selected from the group consisting of 2,2'-oxydi-1-propanol, 1,1'-oxydi-2-propanol, 2-(2-hydroxypropoxy)-1-propanol, triethyl 2-hydroxypropane-1,2,3-tricarboxylateand 1,2,3-triacetoxy propane, and the water, until the realm of corresponding homogeneous compositions can be delimited in a ternary phase diagram;
f) selecting a homogeneous composition within the realm determined in step e).

11. A consumer product comprising the composition according to claim 1.

12. The consumer product according to claim 11 wherein the consumer product is an air freshening product, an activated air freshening device, or a passive air freshening device, or a cartridge or refill for use in an active air freshener device or a passive air freshener device.

13. The consumer product according to claim 12, wherein the activated air freshening device is an electrical plug-in air freshening device capable of providing the fragrance composition to the air.

14. A method of releasing the composition of claim 1 in an atmosphere in a controlled way, from an activated air freshening device, or a passive air freshening device, an electrical plug-in air freshening device capable of providing the fragrance to the air.

* * * * *